United States Patent
Taylor et al.

(10) Patent No.: US 9,163,979 B2
(45) Date of Patent: Oct. 20, 2015

(54) METHOD FOR USING A RIBBON SCALE FOR ADJUSTING THE AMOUNT OF FRENCH FRIES IN A BAG IN A RESTAURANT

(71) Applicants: R. Earl Taylor, Selbyville, DE (US); Julius Selzer, Frederick, MD (US)

(72) Inventors: R. Earl Taylor, Selbyville, DE (US); William Bruce, Ocean City, MD (US); Julius Selzer, Frederick, MD (US)

( * ) Notice: Subject to any disclaimer, the term of this patent is extended or adjusted under 35 U.S.C. 154(b) by 121 days.

(21) Appl. No.: 13/826,650

(22) Filed: Mar. 14, 2013

(65) Prior Publication Data

US 2014/0138163 A1 May 22, 2014

Related U.S. Application Data

(63) Continuation-in-part of application No. PCT/US2012/066280, filed on Nov. 21, 2012.

(51) Int. Cl.

| A47J 37/00 | (2006.01) |
|---|---|
| G01G 15/00 | (2006.01) |
| G01G 21/22 | (2006.01) |
| A47J 37/12 | (2006.01) |
| B65B 1/32 | (2006.01) |
| G01G 23/37 | (2006.01) |
| B65B 19/34 | (2006.01) |

(52) U.S. Cl.
CPC ............... *G01G 21/22* (2013.01); *A47J 37/12* (2013.01); *B65B 1/32* (2013.01); *G01G 15/001* (2013.01); *G01G 23/3721* (2013.01); *B65B 19/34* (2013.01)

(58) Field of Classification Search
CPC ......... A47J 31/12; G01G 21/22; G01G 21/28; G01G 15/001; G01G 2015/005; G01G 2015/008; G01G 9/00; G01G 13/29; G01G 13/2912; G01G 23/00; B65B 1/32; B65B 19/34

See application file for complete search history.

(56) References Cited

U.S. PATENT DOCUMENTS

| 205,684 | A | * | 7/1878 | Rogers | 177/127 |
|---|---|---|---|---|---|
| 379,817 | A | * | 3/1888 | Roscoe et al. | 248/101 |
| 1,853,198 | A | * | 4/1932 | Breaden | 177/50 |
| 1,886,958 | A | * | 11/1932 | Ittem | 222/572 |
| 2,741,450 | A | * | 4/1956 | Thayer et al. | 177/46 |
| 3,845,897 | A | * | 11/1974 | Buttery et al. | 229/117 |
| 3,894,591 | A | * | 7/1975 | Ackeret | 177/126 |
| 4,696,360 | A | * | 9/1987 | Homen | 177/262 |
| 5,050,694 | A | * | 9/1991 | Liang | 177/262 |

(Continued)

FOREIGN PATENT DOCUMENTS

| WO | WO 2010/057147 | * | 5/2010 | G01G 23/00 |
|---|---|---|---|---|
| WO | WO 2013/078329 | * | 11/2012 | G01G 23/00 |

*Primary Examiner* — Randy W Gibson
(74) *Attorney, Agent, or Firm* — J. Andrew McKinney, Jr.; McKinney & Associates, LLC

(57) ABSTRACT

A transportable and repositionable portion control system 10 has an integral portion weight sensing system 90 configured for use with an optional fry ribbon bridge assembly 190 in a portion control method. The portion 14 is held in a portion indexing area, or corral 20 on an upper surface 22 of the scale 10. A portion indexing area 20 is defined between spaced, upstanding container supports 24 and 26 which diverge from one another in a "V" shape and the spacing between the rails is selected to allow a selected variety of known containers such as a cup to be placed on surface 22 between the rails to ensure that the carton is properly located for the weight measurement that is to be carried out by the scale 10.

3 Claims, 9 Drawing Sheets

(56) References Cited

U.S. PATENT DOCUMENTS

| | | | |
|---|---|---|---|
| 5,254,812 A * | 10/1993 | Hilford | 177/262 |
| 5,353,847 A * | 10/1994 | Cahlander et al. | 141/1 |
| 5,641,947 A * | 6/1997 | Riddle, Jr. | 177/126 |
| 5,811,740 A * | 9/1998 | Hamilton, Sr. | 177/144 |
| 6,894,232 B2 * | 5/2005 | Waggoner et al. | 177/25.15 |
| 8,816,223 B2 * | 8/2014 | Taylor et al. | 177/25.13 |
| 8,944,249 B1 * | 2/2015 | Mullaney | 206/459.1 |
| 2004/0026134 A1 * | 2/2004 | Waggoner et al. | 177/160 |
| 2008/0015956 A1 * | 1/2008 | Regard | 705/28 |
| 2008/0078589 A1 * | 4/2008 | Scholpp | 177/244 |
| 2014/0318876 A1 * | 10/2014 | Kellams | 177/45 |

* cited by examiner

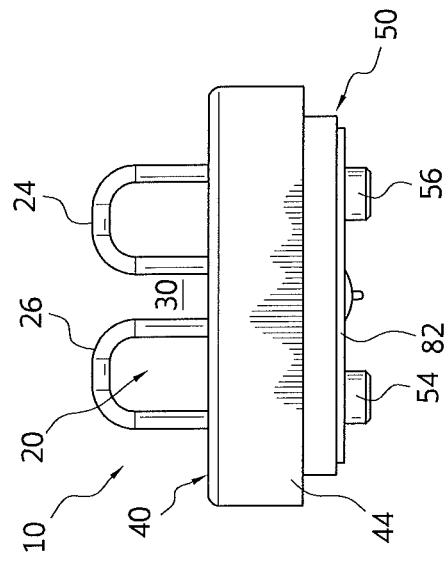
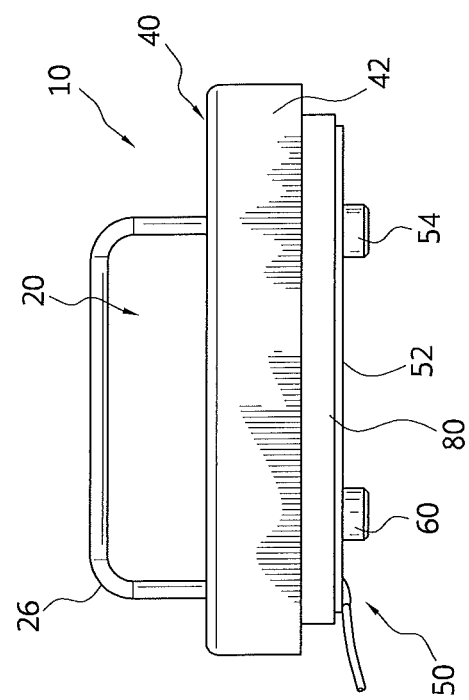
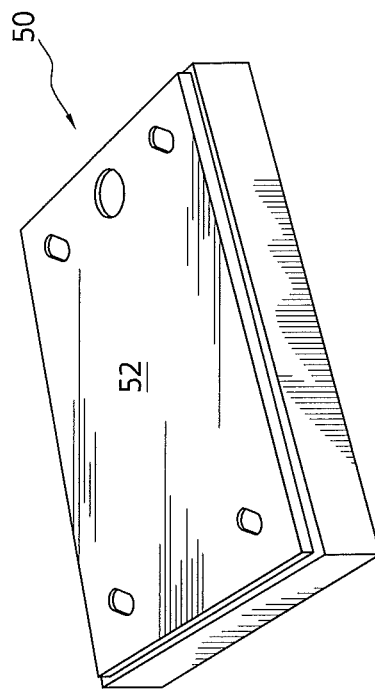

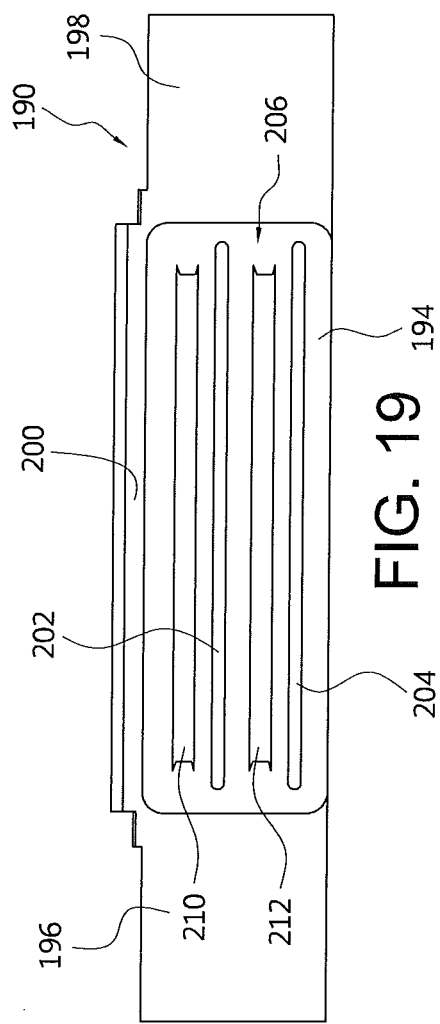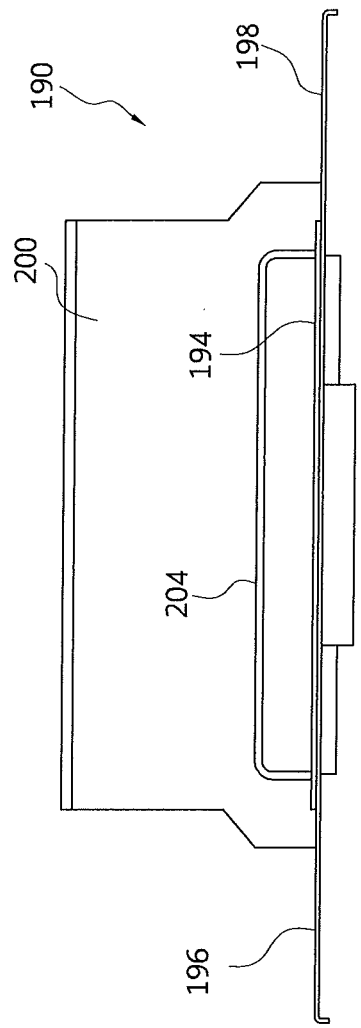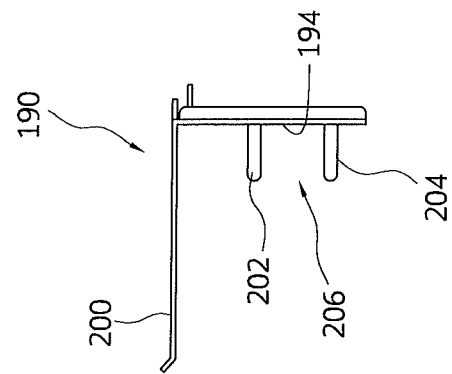

METHOD FOR USING A RIBBON SCALE FOR ADJUSTING THE AMOUNT OF FRENCH FRIES IN A BAG IN A RESTAURANT

CROSS-REFERENCE TO RELATED APPLICATIONS

This application is a continuation-in-part and claims the benefit of PCT application no. PCT/US12/66280, filed Nov. 21, 2012, and U.S. provisional patent application No. 61/562,619, filed Nov. 22, 2011, by Earl Taylor, et al, entitled "Repositionable Food Scale Weight Sensing System and Method" and U.S. Prov app 61/622,282, filed Apr. 10, 2012 and "Repositionable Food Scale Weight Sensing System, Fry Ribbon Bridge Assembly and Method" and is related to commonly owned U.S. provisional patent application No. 61/193,317, filed Nov. 17, 2008, PCT application no. PCT/US2009/064696, filed Nov. 17, 2009, and U.S. patent application Ser. No. 12/678,480, filed Mar. 16, 2010, the entire disclosures of which are hereby incorporated herein by reference.

BACKGROUND OF THE INVENTION

1. Field of the Invention

The present invention relates to a portion control system and method for apportioning cooked foods in a commercial food service or quick-service restaurant setting.

2. Discussion of the Prior Art

Weight check systems are known in the prior art for checking a customer's order or for checking the contents of a bagged order to determine if it is correct. The owners of this application also own U.S. Pat. No. 5,937,386, entitled "Computerized method and system for fulfillment of an itemized food order from a quick-service restaurant menu" which describes a system in which a customer's order is input into a computer system that is adapted to check for the correct food content by means of weighing the bagged order. The restaurant personnel are alerted by the computer system when the packaged order is either overweight or underweight when compared to a predetermined weight range for the total items ordered. While the system and method of the '386 patent is well suited for making sure the customer is given the proper items, it is not adapted specifically for portion control in the quick-service restaurant setting.

French fries are the most popular item served at most quick service or "fast food" restaurants. At one well-known fast food franchise organization, hundreds of millions of orders are sold each year. One of these quick service restaurants (e.g., McDonalds®) is renowned for its quality control methodology and training, which assures their customers of a consistent dining experience at its restaurants across the globe. For French Fries, McDonalds has established a selected weight (e.g., 2.6 ounces) as the average weight of a regular order of French Fries, and the chain bases its pricing, margin and yield calculations around this performance.

Because of the inconsistent length of French Fries, from under 2 inches to 6 inches, it is difficult for store personnel to control portion size. Although stores have access to portion measuring scales for weighing individual servings, these scales are not regularly used, because they add extra steps to the production process, add complexity, and reduce efficiency during busy or peak serving periods.

The common outcome, verified by owners and others familiar with store operations, is that store personnel fill servings visually, leaving extra fries in each bag or carton to minimize customer complaints and speed operations, typically resulting in a 2-3% shortfall in yield. A typical quick service store uses 400-500 pounds of frozen fries per day, translating to 1600-2000 orders served per day. Improving yield by 1% results in 16-20 more servings sold per day from the given quantity of fries, and an increased daily profit of $19-$26 per store, or over $600 per month. Therefore, improving the yield for French Fries represents the single most obvious, universal opportunity to improve the bottom line of "fast food" restaurants. Accordingly, a method or apparatus is needed that accurately determines the portion size or weight for each serving of a comestible such as French Fries, but only if that solution does not slow down service or the existing Fry preparation process.

Fresh, hot Fries are typically prepared at a stainless steel "fry station". Each station consists of a "fry tub" containing 1 or 2 receptacle bins for the temporary storage of hot fries, infrared heat lamps placed above the station for keeping the product hot (140-165 F), a shelf or shelves for retrieving paper serving containers of all 3 sizes, and a "fry ribbon." The Fry Ribbon is a special metal grate/railing sitting above the tub, designed to hold individual servings, and for allowing any dropped fries to fall through into the tub below. A typical fast food restaurant likely uses a fry station with features that have evolved over time and will likely continue to change, and there are many different sizes and shapes, as the design of fry ribbons has changed many times over the years and will continue to do so. A typical preparation and serving process is as follows:

1. Hot fries are dumped from a fryer basket into the tub.
2. The operator adds salt to the fries.
3. The operator places an empty pouch, bag or container on the fry ribbon or holds the container in his or her hand and uses a fry scoop to pick up fries from the tub and place them in the container. The fry order (i.e., serving or portion) is weighed and adjusted, if needed. When no adjustment is needed (meaning the fry order meets standards for quality and weight), the order container is placed (or slid) to one side (e.g., the left) for "first in-first out" dispensing to the customer.
4. The operator repeats the process with the next empty container
5. Each prepared serving remains on the fry ribbon until it is dispensed. Users typically place the serving containers in a horizontal row, with regular servings and large servings in separate rows on the fry ribbon.
6. As more servings are prepared, the operator slides the prepared servings toward the left.
7. As a customer order is prepared, fry servings are picked from the left side (first-in, first-out procedure).

The foregoing procedure is so ingrained in training and personnel habits that it must remain relatively undisturbed if fast food restaurant operators are to adopt any portion control solution. There is a need, therefore, for a convenient, flexible, inexpensive and unobtrusive system and method for automated weighing of individual packaged French Fry servings or portions for use in a restaurant or fast food setting. It is noted that French fries are a foodstuff or comestible which is often prepared, cooked or fried before being apportioned or packaged for (hopefully) immediate sale and delivery to the customer, and other foodstuffs present similar challenges. Thus, there is also a need for automated apportionment or weighing of individual packaged servings or portions of other comestibles for use in a restaurant or fast food setting. In order to meet this need, a system and method must provide a time-efficient and relatively fool-proof measurement method and apparatus, ensuring that the customer receives the correct quantity of product while avoiding excessive portions, which diminish profit levels for the restaurant. There is a need for a more versatile scale to weigh cooked food products to fit onto/into existing equipment designs that leave no area that is intended to accommodate a food scale.

OBJECTS AND SUMMARY OF THE INVENTION

Accordingly, it is an object of the present invention to overcome the above mentioned difficulties by providing a convenient, flexible, inexpensive and unobtrusive system and method for automated apportioning or weighing of individual packaged foodstuff servings or portions for use in a restaurant or quick-service, fast food setting.

In accordance with the present invention, therefore, a system and method for time-efficient, convenient measurement of food servings is provided to ensure that a customer receives the correct quantity of product while avoiding excessive portions, which diminish profit levels for the restaurant. The present invention makes quick and convenient weighing of food products available for use with existing restaurant equipment that does not accommodate prior measurement products, providing a system and method that has more flexibility than prior measurement systems since it is not required to be permanently fastened with bridge supports and can be used in situations where space is a problem.

An exemplary embodiment adapted for use with French fries will be described herein, but it is to be understood that this embodiment illustrates principals and features which are readily adapted for use with a variety of foodstuffs which are typically cooked (e.g., fried, baked, steamed or boiled) in significant quantities before being divided into individual portions.

Briefly, in one embodiment the present invention consists of a standalone scale having a flat floor and a "v" shaped corral area, defined by spaced rails, for example, in which the food to be weighed is placed. The "v" shape of the corral area allows products of different sizes to be weighed, while only requiring one area, or space, for the scale. For example, an order of French fries may be the food product to be weighed. In this case, the French fries are placed into an appropriate container such as a bag or box, and the container is placed onto the scale floor between the rails, where it is rapidly weighed. If the container is either over or under the required weight, adjustments may be made by adding or removing product before the individual order is either delivered to the customer or is placed onto the fry ribbon holding area for temporary storage until it is served.

In accordance with the present invention, the standalone scale is repositionable or transportable, and incorporates an integral portion weight sensor and software to detect and weigh individual orders or containers of products such as French Fries having selected portion sizes. In use, fries are picked up from a holding area, as by using a scoop, and are placed into a container having a selected portion size, corresponding to an assigned weight. The container is placed on the standalone transportable universal ribbon scale, and its weight sensor displays the weight of the container and its contents. The amount of fries in the container is adjusted until the scale registers the desired weight for that container, and the weighed container is then moved to a separate storage area, or fry ribbon, for subsequent retrieval and service to a customer or consumer. This process ensures that a full order or portion is delivered to the customer while avoiding unnecessary loss in excessive portions, thereby preserving the restaurant owner's profit margin.

The weight sensor is integrated into the transportable universal ribbon scale structure, and preferably includes electronic resistive strain gauges (or load cells) typically bonded in situ and centered under any support surface of the scale structure, to measure bending or deflection in a portion of that surface. Typically, the sensors are on flexible postage-stamp sized substrates which are bonded in place under a panel or beam, and as the panel or beam deflects under a sensed load, the load cell substrate bends and a contemporaneous change in an electrical parameter (e.g., resistance) is detected. Strain gauge placement is typically wherever the beam or platform's deflection will be sensed most accurately. For this invention the sensor is preferably centered under the surface supporting the apportioned comestibles (e.g., French fries), between the guide rails. The load cell is connected by wires, or by wireless communication, to a computer or terminal which is configured to provide visible or audible indication that a given portion is (a) correct, (b) too light, or (c) too heavy. The portion control terminal or computer may be configured to store the weight sensor data and to log that data over time, and may be programmed to provide reports on portion sizes, numbers of portions, and related statistics, profit/loss information and loss prevention information to restaurant managers.

In another embodiment of the invention, two load cells are spaced along the v-shaped corral, with each cell measuring a corresponding container size and weight. Smaller containers slide further into the small end of the v between the rails, and are aligned above a first sensor, while larger containers are prevented from entering as far into the corral area, and thus are held over the second sensor.

In another aspect of the invention, a repositionable fry ribbon bridge assembly is provided for use in filling containers with comestibles. The bridge is configured to span a fry tub and has at least two spaced, elongated fence supports aligned along slot-shaped apertures having a slot width and length configured to pass excess comestibles from the finished portion storage/weighing area downwardly back into the fry tub. In use, the fry ribbon bridge assembly is positioned over a holding area for comestibles, and a transportable and repositionable universal ribbon scale is placed on laterally projecting scale support surfaces attached to said fry ribbon assembly. A container of comestibles having a preselected weight and portion size is placed in a vertically projecting fence area attached to fry ribbon bridge assembly, which fence area is configured to support the container in a substantially upright orientation. The container is filled with comestibles for a complete portion size and is moved to a corral area of the universal ribbon scale, where it is weighed and the number of comestibles in said container is adjusted until the measured weight of the container is equal to a preselected weight for such a container. Thereafter, the container is moved to a serving area.

In accordance with the invention, each sensor detects a corresponding single sized package. The food sensor is connected to an alarm or indicator which an operator can easily perceive when adding comestibles to or removing them from a container resting on the ribbon scale to prepare a portion of the correct weight, thereby allowing quick and easy handling of the product. The transportable universal ribbon scale is a standalone apparatus that can fit onto or into existing equipment designs that typically do not allow for additional apparatus.

While the present invention is described for the handling of French fries, it should be understood that the invention is equally applicable, with no significant modifications, to the handling of a wide variety of comestibles that are served in containers, including but not limited to chicken nuggets, clam strips, fried shrimp, onion rings, and the like.

DESCRIPTION OF THE FIGURES

The foregoing, and still further objects, features and advantages of the present invention will become apparent upon consideration of the following detailed description of preferred embodiments thereof, particularly when taken in conjunction with the accompanying drawings, wherein like reference numerals in the various figures are utilized to designate like components, and in which:

FIG. 9 is a side elevation of the scale of FIG. 6;

FIG. 10 is an end view of the scale of FIG. 6, with the guide rails removed;

FIG. 11 is a bottom perspective view of the device of FIG. 1;

FIG. 19 is a top plan view of the device of FIG. 17;

FIG. 20 is front elevation of the device of FIG. 19; and

FIG. 21 is an end view of the device of FIG. 19, in accordance with the present invention.

DESCRIPTION OF PREFERRED EMBODIMENTS

Figure 1:
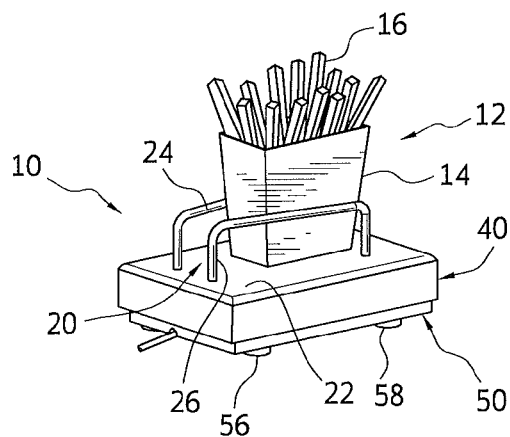
FIG. 1 is a perspective view illustrating a transportable universal ribbon scale carrying an example of a product properly positioned to be weighed, in accordance with a first embodiment of the present invention.
Figure 2:
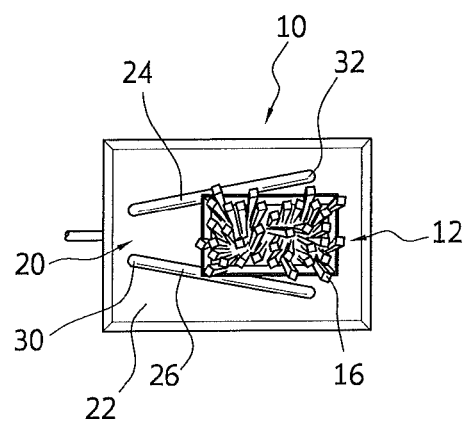
FIG. 2 is a top perspective view illustrating the transportable universal ribbon scale of FIG. 1.
Figure 3:
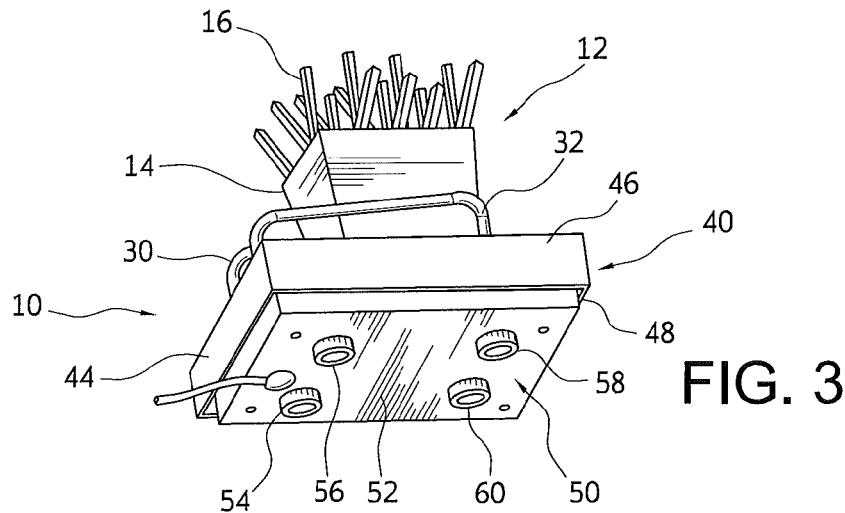
FIG. 3 is a bottom perspective view illustrating the transportable universal ribbon scale of FIG. 1.
Figure 4:
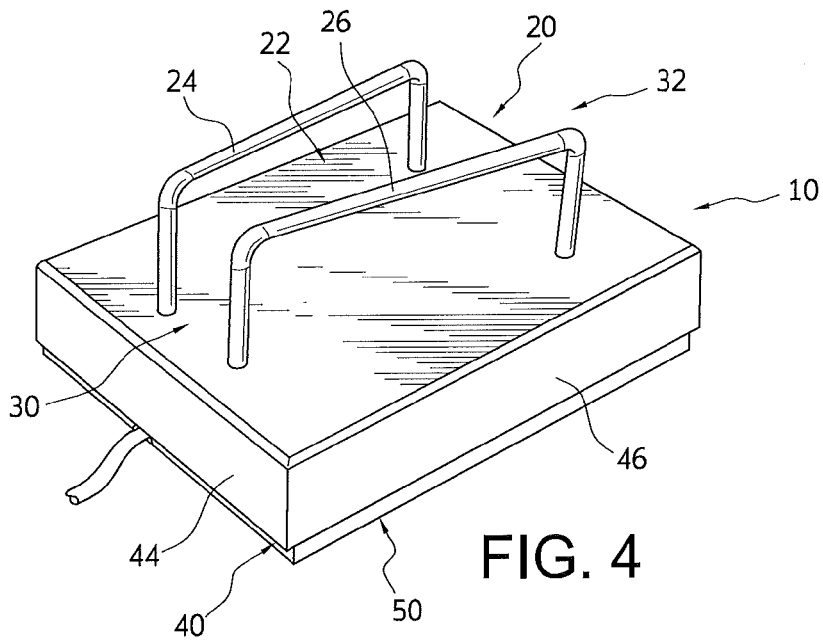
FIG. 4 is a top perspective view of one side of the transportable universal ribbon scale of FIG. 1.
Figure 5:
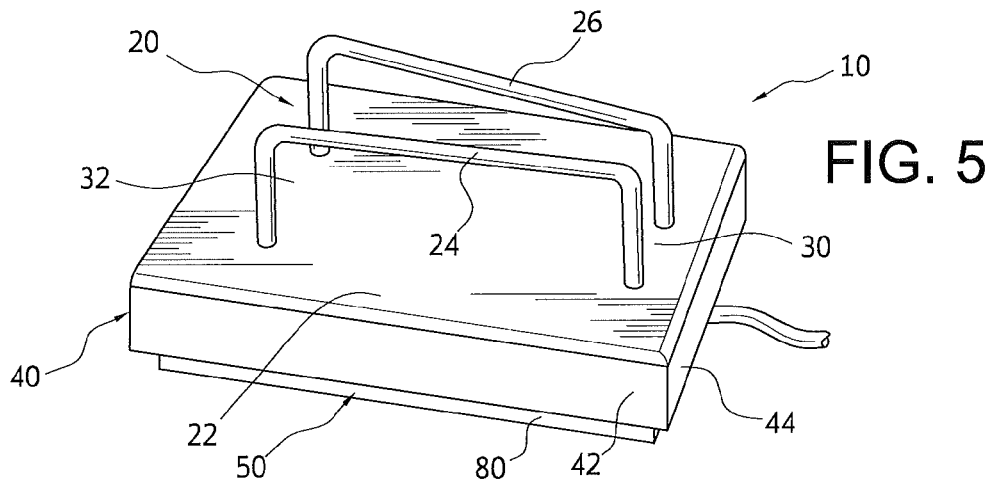
FIG. 5 is a top perspective view a second side of the transportable universal ribbon scale of FIG. 1.

Turning now to a more detailed description of exemplary embodiments of the present invention, wherein similar numbers in the various Figures illustrate common features, there is illustrated in FIGS. 1-5 a portable, or transportable, universal ribbon scale 10, shown in several of the Figures as supporting a portion of comestibles 12. The portion 12 in these Figures is illustrated as including a single portion container such as a carton 14 of a food product such as French fries, although other containers and other food products could equally well be provided. The carton 14 is held in a portion indexing area, or corral 20 on an upper surface 22 of the scale 10. In accordance with a preferred embodiment of the present invention, the portion indexing area 20 is defined between spaced, upstanding container supports such as fence members, or rails 24 and 26 mounted on the upper surface 22. The fence rails diverge from one another in a "V" shape, best seen in FIG. 2, from a narrower opening at a first end 30 to a wider opening at a second end 32, in accordance with the present invention. The spacing between the rails is selected to allow a selected variety of known containers such as carton 14 to be placed on surface 22 between the rails and to slide into the corral a predetermined distance. The distance the carton can move into the corral is dependent on the size (width) of the carton to ensure that the carton is properly located for the weight measurement that is to be carried out by the scale 10.

In the illustrated embodiment, the transportable universal ribbon scale 10 is in the form of a rectangular box having a hollow cover, or lid 40 incorporating the surface 22 as its top and having downwardly extending side walls 42, 44, 46 and 48. The cover, which may be referred to herein as a scale "ribbon", carries the rails 24 and 26, as described above, and encloses, and is mounted to move freely on, a base unit 50, best seen in the bottom perspective view of FIG. 3. The bottom wall 52 of the base 50 incorporates four rubber mounting feet 54, 56, 58 and 60 for positioning the scale on a food service station, to be described.

Figure 7:
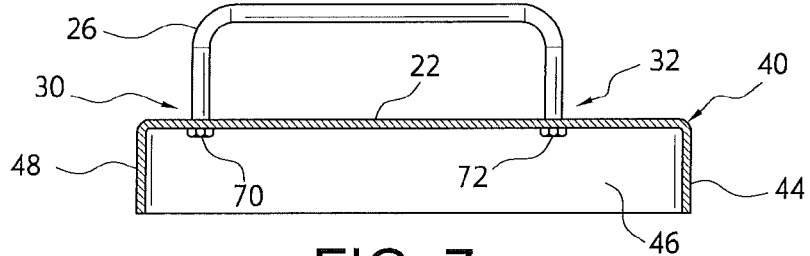
FIG. 7 is a side elevation sectional view of the cover, or ribbon portion of the scale of FIG. 1, taken along line A-A of FIG. 6.
Figure 8:
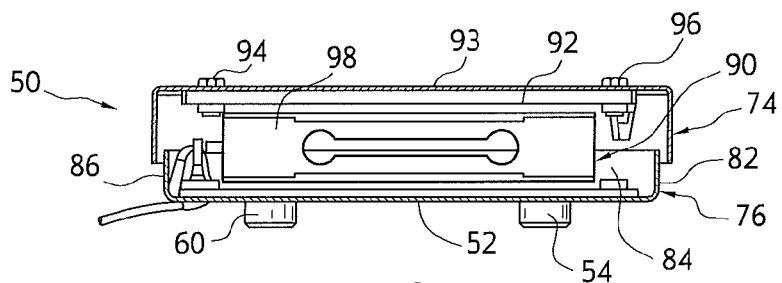
FIG. 8 is a side elevation sectional view of the scale of FIG. 1, taken along line A-A of FIG. 6.
Figure 6:
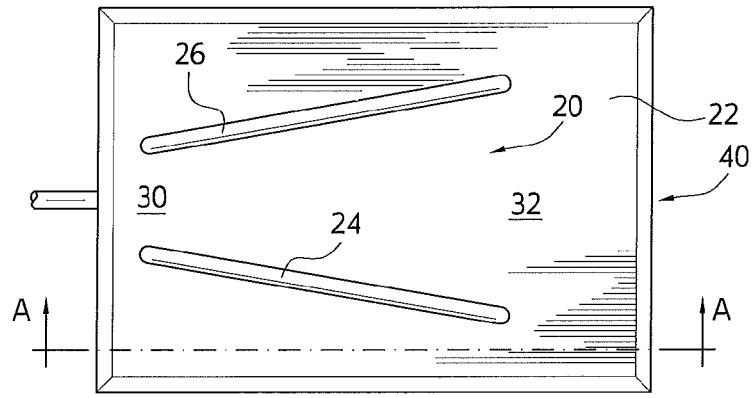
FIG. 6 is a top plan view of the transportable universal ribbon scale of FIG. 4, illustrating the tapered corral area between converging rails.
Figure 13:
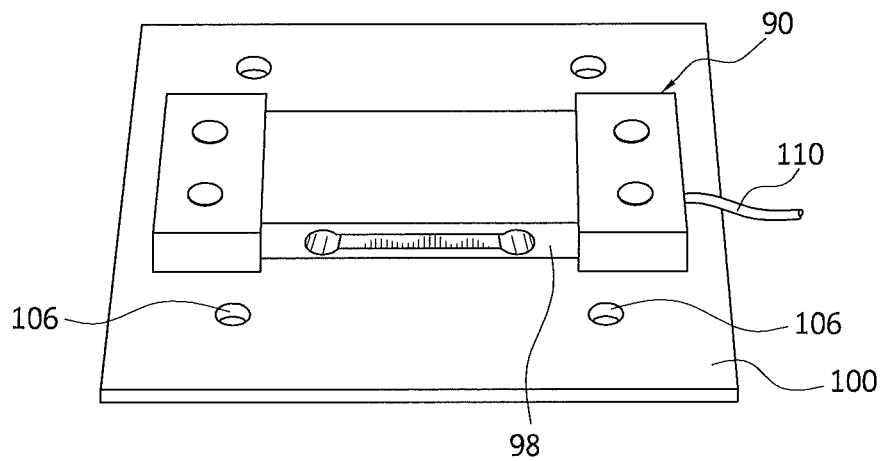
FIG. 13 is a top perspective view of a load cell base mounting assembly used in the scale of FIG. 1.

FIGS. 6-11 illustrate details of the foregoing embodiment of the transportable universal ribbon scale 10, with FIG. 6 being a top plan view of the scale of FIG. 1, and showing the lid, or ribbon 40 carrying the diverging rails 24 and 26 on top surface 22, with the narrow end of the V formed by the rails being to the left as viewed in the Figures. FIG. 7 is a sectional side elevation view taken along line A-A of FIG. 6, and illustrates the ribbon 40 separated from its base. Nuts 70 and 72 secure the rail 24 to the surface 22, and it will be understood that rail 26 is similarly secured. The ribbon preferably is of stainless steel and is removable from the base for easy cleaning FIG. 8 is a sectional view of base unit 50, also taken along line A-A of FIG. 6, while FIGS. 9 and 10 are side elevation and right-hand end views, respectively, and FIG. 11 is a bottom perspective view of the scale 10 of FIG. 6. The ribbon 40 covers the base unit 50, with the ribbon's downwardly extending side walls 42, 44, 46 and 48 surrounding a base unit cover 74 and bottom tray 76, illustrated in FIG. 14, having corresponding tray side walls 80, 82, 84 and 86 that extend upwardly from the bottom wall 52 of the base unit 50. The ribbon fits over the base unit, including its cover, and is movable with respect to the base for transmitting the weight of packages, such as carton 14 or other food containers, to a load cell mounted within base unit 50. The base unit cover 74 carries a load cell mounting assembly 90, also illustrated in FIG. 13, having a narrow, elongated sensor strip 92 secured to the underside of a top wall 93 of the cover 74, as by suitable bolts 94 and 96. A bendable support beam 98 is secured to the sensor strip and is in turn mounted on a support plate 100 carrying four magnetic feet 102, illustrated in FIG. 15, each having an upwardly extending pin 104 that extends through a corresponding aperture 106 in plate 100.

Figure 14:
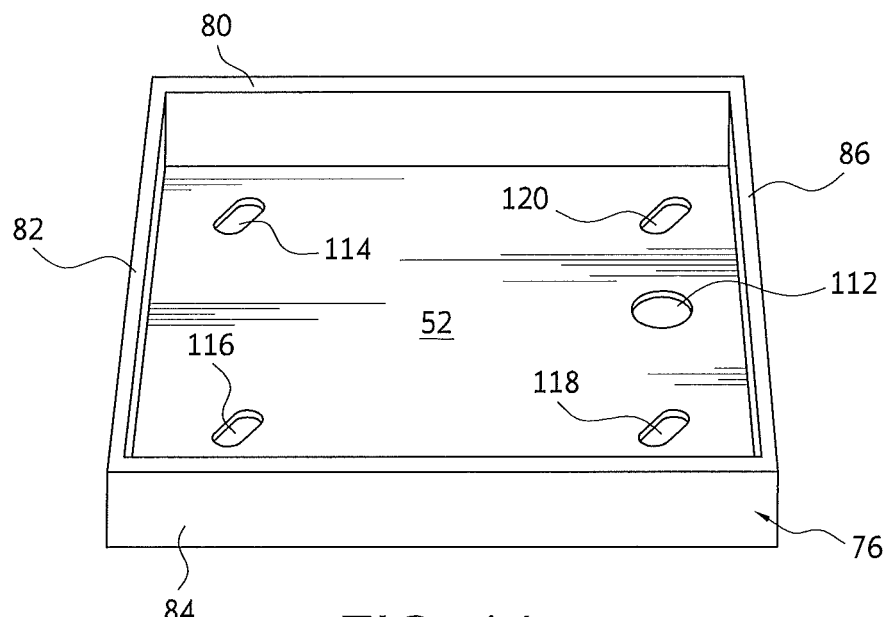
FIG. 14 is a top perspective view of the bottom of the scale base assembly which secures the load cell base mounting assembly of FIG. 13.
Figure 15:
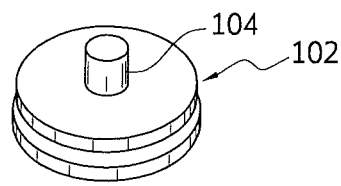
FIG. 15 is a detailed perspective view illustrating a magnet assembly for securing the scale to a food service station, in accordance with the present invention.

The scale is assembled by placing the cover 74 over the base tray 76 while inserting the load cell 90, including its support plate 100 into the interior of the tray, as illustrated in FIG. 14, with the magnetic feet 102 holding the assembly 90 and the cover 74 in place. A cable 110 that is connected to the load cell sensor strip to carry sensor signals to a display alarm panel, to be described, passes through a corresponding aperture 112 in the base tray. It will be noted that the apertures 114, 116, 118 and 120 in the tray bottom receive the rubber feet 52, 54, 56 and 58. The floating ribbon 40 is then placed over the base 50, to complete the assembly. In the illustrated prototype embodiment, the cover/ribbon 40 can be removed and washed while the base 50 may not be suited for immersion in water because the solid state sensor electronics may not be sealed into a washable assembly. If base 50 cannot be immersed, the load cell cannot be affixed to the underside of surface 22 of ribbon 40. If the electronics of the load cell are sealed into a washable assembly, however, then the washable load cell assembly may be affixed to the underside of surface 22 of ribbon 40. In the illustrated embodiment of FIGS. 5-8, there are no bolts on surface 22 to correspond to bolts 94 and 96 in FIG. 8, so lid/ribbon 40 (of FIGS. 5 and 7) is configured to fit over the entire base unit 50 of FIG. 8, and thus rests on the tops of the bolts 94, 96 to provide an enclosed unit. Alternative configurations can be developed which permit accurate sensing of force or weight from a portion held substantially in the center of surface 22.

Figure 12:
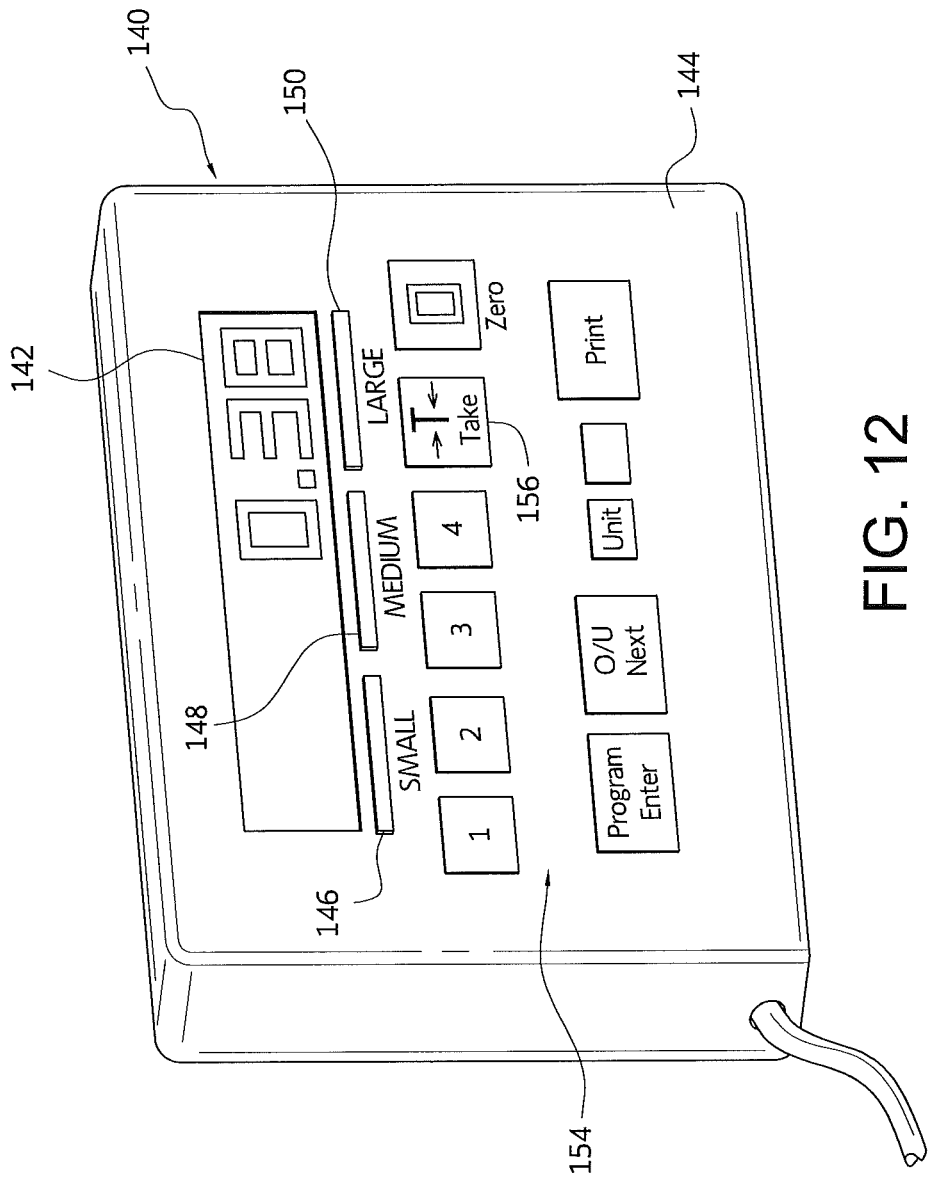
FIG. 12 illustrates a system controller and display panel configured and programmed for use with the scale of FIGS. 1-11.

The load cell may incorporate a controller that is responsive to weight signals from the weight sensor and incorporates software that is pre-programmed to compare the weight signal to pre-selected weights or weight ranges for individual orders of comestibles in selected portion sizes and to generate a corresponding portion weight status signal to the sensor cable 110. This cable is connected to a suitable controller and scale display such as the controller and display unit 140 illustrated in FIG. 12 which, in one form of the invention, includes a digital readout panel 142 mounted on the face 144 of the display. The readout responds to the weight status signals carried by cable 110 from the load cell sensor 92 to provide an indication of the weight of a container of food product that is placed on surface 22 between the diverging rails 24 and 26. As described above, the spacing between the rails is such that a container is slid onto surface 22, it will contact the rails at a location that will place the container over the load cell to ensure an accurate reading.

Preferably, the readout panel will also incorporate alarm lights that will give a visual warning if the container being weighed is over or under weight. For example, a lamp 146 may be a yellow LED that will measure the weight of a small container of French fries, providing a yellow light if the container weighs between 2.35 oz. and 2.65 oz., no light if it is below this range, and a flashing light if the weight is above this limit. Similarly, a lamp 148 may be a green LED that shows a steady green when the container weighs between 3.85 and 4.16 oz., is off if below and flashing when above these limits, and a lamp 150 may be a red LED that illuminates for a container having between 5.85 and 6.15 oz., is off or flashes when its weight is below or above this range. Various other conventional controls may be provided for the readout panel, such as a reset 152 and programming buttons generally indicated at 154.

In use, a container 14, which may be a bag or box for a food product, is filled by an operator and is placed on the scale ribbon surface 22 between the rails 24 and 26. The operator slides the container toward the narrow end of the opening between the rails to center it over the load cell, and the readout panel provides a weight measurement readout and an LED lamp illuminates, depending on the size container selected by the operator. If the lamp corresponding to the size of the container does not come on, it is underfilled, and if it is flashing, it is overfilled. The weight indicator readout will tell the operator how much product to add to or remove from the container, and when the weight is correct, the lamp stops flashing, the container is removed and the next one filled and positioned for measurement. Furthermore, if the scale ribbon 40 is not floating free on the base unit 50, the display panel 142 will provide a warning readout, requiring adjustment of the unit and pressing of the reset button 152.

It will be understood from the foregoing description that the diverging rails 24 and 26 will contact the walls of a container such as the carton 14 as the carton slides into the corral 20 from the wide-opening end toward the narrow-opening end, and will stop the carton at a location over the load cell 92 corresponding to the size of the container. Although a single sensor may be provided in the load cell to measure the weight of any container located in the corral 20, if desired multiple sensors may be provided that are responsive to the location, and thus the size of the container to provide a corresponding readout.

Figure 16:
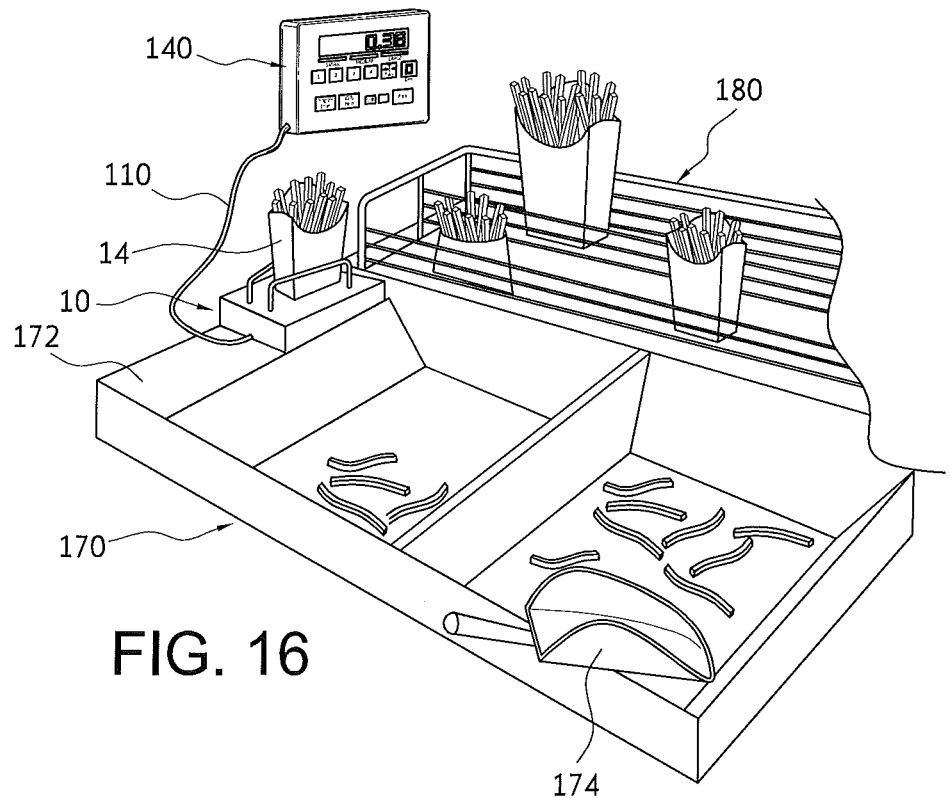
FIG. 16 is a perspective view illustrating the orientation and arrangement of the transportable universal ribbon scale of FIG. 1 in relation to a fry tub.
Figure 17:
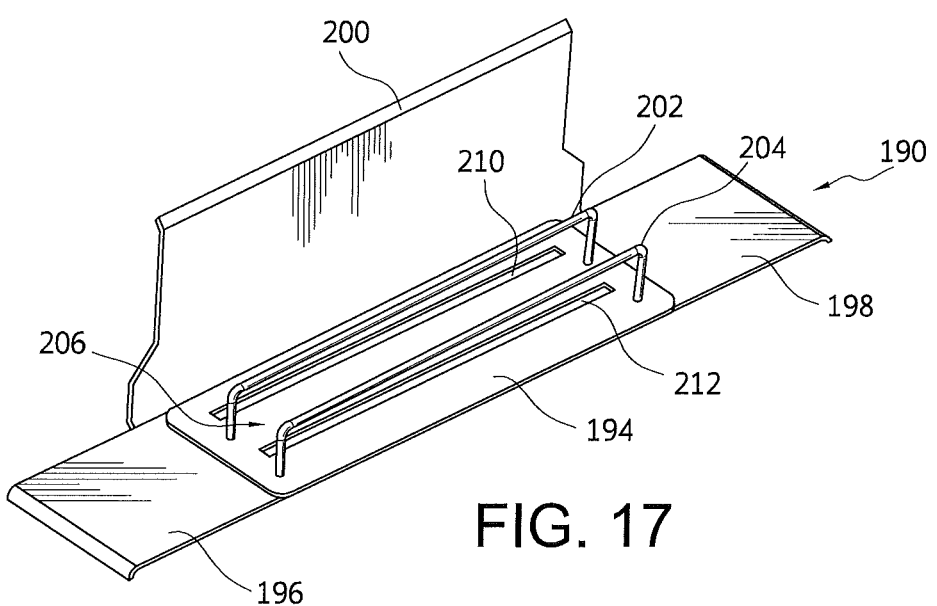
FIG. 17 is a top perspective view illustrating a second preferred embodiment of the fry ribbon assembly, in accordance with the present invention.
Figure 18:
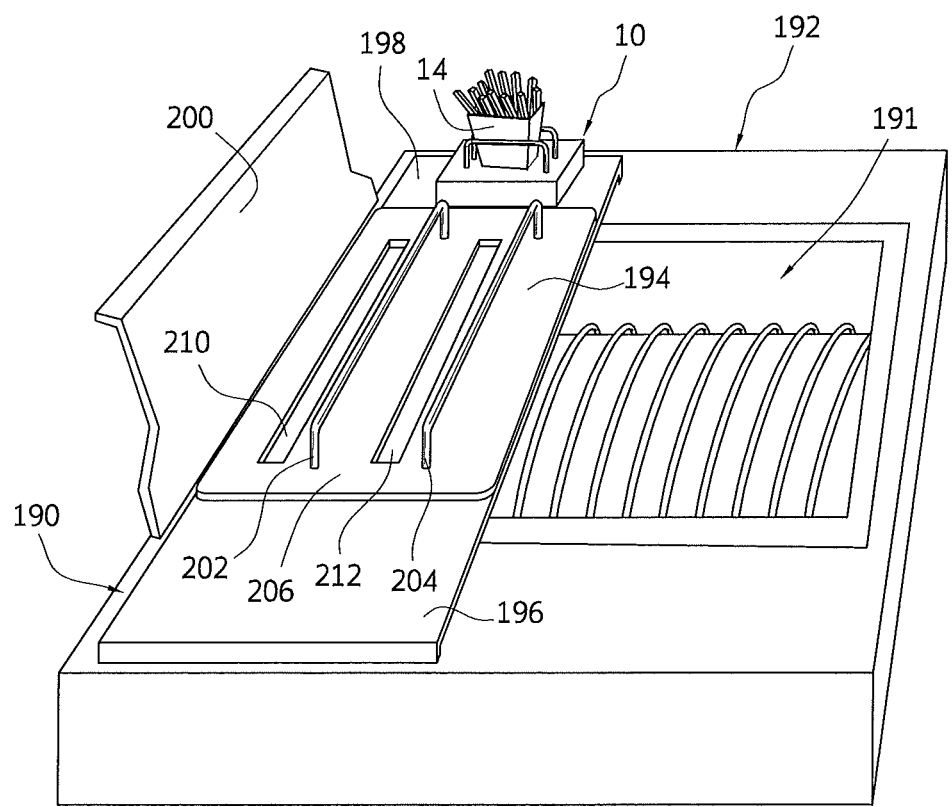
FIG. 18 is a perspective view illustrating the orientation and arrangement of a preferred embodiment of the fry ribbon assembly in relation to a fry tub at a food service station.

FIG. 16 diagrammatically illustrates an example of the orientation and arrangement of the transportable universal ribbon scale 10 of FIG. 1 in relation to a conventional fry tub 170, wherein the scale is positioned on a shelf 172 adjacent tub 170. As is known, after French fries have been cooked, they are conventionally dumped into a tub, from which they are picked up by means of a scoop and a selected quantity is placed in a container such as the carton 14. The carton is placed on the scale 10 and its contents adjusted in accordance with the readout on display 140; then it is moved to a conventional storage rack 180 until it is served to a customer.

Portion indexing area 20 between the rails 24 and 26, as described above, may be oriented to be most convenient for use by repositioning transportable universal ribbon scale 10 on the selected surface 172 so the operator may laterally slide or insert carton 14 into position between fence members 24 and 26. As noted above, a food preparation station for use in restaurants can be constructed in any one of many different sizes and shapes, as the design of such stations not only differ for different foods, but have changed many times over the years, and will continue to do so. Accordingly, the configuration of the system of the present invention can be changed to meet different needs.

One example of such an adaptation to a food preparation station that does not incorporate a space such as shelf 172 for placing a scale 10 is illustrated in FIGS. 17-21, wherein a repositionable bridge assembly 190 is provided to be mounted on, and to span, a comestible holding area 191 in a fry tub 192. Assembly 190 includes an elongated ribbon panel 194 having left and right laterally projecting scale support surfaces 196 and 198, and an upstanding back panel 200. Upwardly projecting, spaced apart, generally parallel fence members 202 and 204 extend longitudinally along the panel 194 to define and bound a portion indexing area 206. Openings 210 and 212 through panel 194 are slot-shaped apertures having a slot width and length configured to pass excess comestibles (e.g., french fries) from the finished portion indexing area 206 downwardly into the fry tub holding area 191. The repositionable bridge assembly 190 thus is configured to span a fry tub holding area and to provide convenient lateral surfaces 196 and 198 on which a scale 10 can be placed for weighing comestible containers that are filled using the bridge, as diagrammatically illustrated in FIG. 18, where scale 10 is positioned on lateral surface 198. An operator positions a container on the ribbon panel 194 in the indexing area 206, and fills it in the manner described with respect to FIG. 16. Excess food product falls through the openings 210 and 212 back into the tub, and the operator then moves the container to the scale on surface 198 or that may be positioned elsewhere near the indexing area, as on the lateral surface 196 or some other nearby surface.

As noted above, French fries are an exemplary foodstuff or comestible which is often prepared, cooked or fried before being apportioned or packaged for sale and delivery to the customer, but other comestibles are apportioned and delivered to the customer in a similar way. Thus, the system and method of the present invention is readily adapted for convenient and accurate apportionment or weighing of individual packaged servings or portions of other comestibles for use in a restaurant or fast food setting. Exemplary other comestibles include fried or baked onion rings, fried or baked popcorn shrimp, steamed shrimp, fried or baked chicken nuggets, fried or baked clam strips, fried or baked corn fritters, fried or baked tater tots and various other foodstuffs which are typically cooked in large quantities before being divided into many individual portions, and after being drained and optionally salted, seasoned or treated with a flavoring agent, powdered coating or the like.

The system and method of the present invention as described and illustrated here makes available a transportable and repositionable portion control system, comprising a portion weight sensing system including controller or computer 140 and a repositionable scale 10 with a weight sensor, where the weight sensor is configured to provide a weight signal to controller 140, and where the controller is programmed with portion control software to respond to user inputs and control the display 142. Controller 140 is either integrated into a unitary housing with the display or may optionally be remotely located and configured to communicate via cables or wirelessly with the display which is positioned near the comestibles preparation area or fry ribbon to be visible to a user. The eight sensing system is thus configured to weigh individual orders of comestibles such as French Fries in selected portion sizes 12, as seen in FIGS. 1-3, 16 and 18. Scale 10 includes an upper surface with a portion indexing area defined between spaced, upstanding portion supporting rails 24, 26 which are spaced from one another and wherein the spacing between the rails is selected to allow a selected variety of known portion containers to be placed on said upper surface between the rails to support the portion in a location for weight measurement. In the embodiment illustrated in FIGS. 1-11, the transportable and repositionable portion control scale's upper surface portion indexing area is defined between spaced, upstanding portion supporting rails 24, 26 which diverge from one another in a narrow acute angle or "V" shape where the spacing between the rails is selected to allow a selected variety of known portion containers (e.g., 12) to be placed on upper surface between the rails to ensure that the portion is properly located for a portion weight measurement that is to be carried out by the scale 10.

Figure 22:
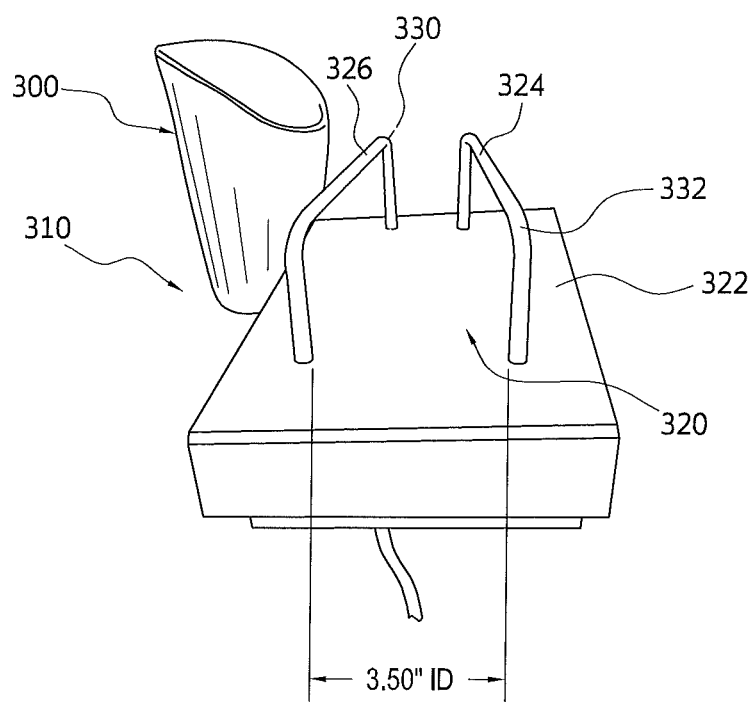
FIG. 22 is a perspective view illustrating an alternative embodiment of the present invention.

FIG. 22 illustrates a perspective view illustrating an alternative embodiment of the present invention. Scale 310 is able to receive single portion cups 300 of comestibles wherein said cup 300 is substantially frustoconical with rigid side walls. The fence rails 324, 326 diverge from one another in a "V" shape, from a narrower opening at a first end 330 to a wider opening at a second end 332 having an inside dimension of 3.50 inches to create portion indexing area 320. The rails have taller fence members that are approximately 2 inches from upper surface 322 of scale 310 to accommodate portion containers or cups 300 holding comestibles such as popcorn shrimp or popcorn chicken or fried fish bites.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention, as defined in the following claims.

What is claimed is:

1. A method for preparing a plurality of individual portions from comestibles freshly prepared in a large quantity, comprising:
    (a) placing a fry ribbon assembly over a holding area for comestibles;
    (b) placing a transportable and repositionable universal ribbon scale on laterally projecting scale support surfaces attached to said fry ribbon assembly;
    (c) placing a container of comestibles having a pre-selected weight and portion size in a vertically projecting fence area attached to said fry ribbon assembly, wherein said fence area is configured to support said container in a substantially upright orientation and has a an inside dimension of 3.5 inches at the widest end and a height of at least 2 inches;
    (d) filling said container with comestibles for a complete portion size;
    (e) moving said container from said fence area of said fry ribbon assembly to a corral area of said universal ribbon scale;
    (f) weighing said container on said universal ribbon scale;
    (g) adjusting the number of comestibles in said container until weight of said container is equal to pre-selected weights for said container;
    (h) moving said container to said fence area on said fry ribbon assembly.

2. The method of claim 1, wherein step (c) comprises sliding the portion in a container laterally toward the narrow end of an opening between the rails to center it over a load cell in said scale.

3. A standalone, transportable, and repositionable universal ribbon scale for use in preparing individual portions from comestibles freshly prepared in a large quantity, comprising:
    an indexing ribbon surface including container supports said container supports being configured to support a container or packaged portion of comestibles in a substantially upright orientation;
    said container supports being configured to provide a "V" shape corral area adapted for receiving single portion cups of comestibles to be weighed;
    a base unit receiving and supporting said indexing ribbon surface;
    at least one weight sensor within said base unit and responsive to a container on said ribbon surface for generating a corresponding weight signal,
    a controller responsive to said weight signal and pre-programmed to compare said weight signal to pre-selected weights for individual orders of comestibles in selected portion sizes and to generate a portion weight status signal;
    a perceivable indicator responsive to said weight status signal, said weight sensor being responsive to changes in the weight of said container caused by the addition or removal of comestibles from a container resting upon said indexing ribbon surface;
    further including a repositionable bridge assembly configured to span a fry tub and having at least first and second parallel elongated fence supports aligned beside at least one slot-shaped aperture having a slot width and length configured to pass excess comestibles from the finished portion storage/weighing area downwardly into the fry tub wherein said fence supports have a height of at least 2 inches to hold a single portion cup of comestibles.

* * * * *